(12) United States Patent
Igarashi et al.

(10) Patent No.: US 9,037,718 B2
(45) Date of Patent: May 19, 2015

(54) METHOD AND APPARATUS FOR LIVE REPLICATION

(75) Inventors: Ken Igarashi, Sunnyvale, CA (US); Dwight Leu, Los Gatos, CA (US); Ulas Kozat, Santa Clara, CA (US)

(73) Assignee: NTT DOCOMO, INC., Tokyo (JP)

( * ) Notice: Subject to any disclaimer, the term of this patent is extended or adjusted under 35 U.S.C. 154(b) by 414 days.

(21) Appl. No.: 12/730,114

(22) Filed: Mar. 23, 2010

(65) Prior Publication Data

US 2010/0250718 A1 Sep. 30, 2010

Related U.S. Application Data

(60) Provisional application No. 61/163,372, filed on Mar. 25, 2009.

(51) Int. Cl.
| | |
|---|---|
| *G06F 15/173* | (2006.01) |
| *G06F 9/455* | (2006.01) |
| *G06F 9/46* | (2006.01) |
| *H04L 12/701* | (2013.01) |
| *H04L 29/08* | (2006.01) |
| *G06F 9/50* | (2006.01) |
| *G06F 3/06* | (2006.01) |

(52) U.S. Cl.
CPC ............ *H04L 45/00* (2013.01); *H04L 29/0854* (2013.01); *G06F 3/0647* (2013.01); *G06F 3/065* (2013.01); *G06F 9/45533* (2013.01); *H04L 67/1002* (2013.01); *G06F 9/5088* (2013.01); *G06F 2209/5022* (2013.01)

(58) Field of Classification Search
CPC ..................................................... G06F 3/065

USPC .............. 709/226, 223, 225, 245; 718/1, 100, 718/104; 711/154
See application file for complete search history.

(56) References Cited

U.S. PATENT DOCUMENTS

| | | | | |
|---|---|---|---|---|
| 7,080,378 | B1 * | 7/2006 | Noland et al. ................ | 718/104 |
| 8,135,930 | B1 * | 3/2012 | Mattox et al. ................. | 711/162 |
| 2003/0051021 | A1 * | 3/2003 | Hirschfeld et al. ........... | 709/223 |
| 2005/0005006 | A1 * | 1/2005 | Chauffour et al. ............ | 709/223 |
| 2005/0080913 | A1 * | 4/2005 | Thomas ........................ | 709/230 |
| 2006/0069761 | A1 * | 3/2006 | Singh et al. .................. | 709/222 |
| 2007/0271428 | A1 * | 11/2007 | Atluri ........................... | 711/162 |
| 2008/0201414 | A1 * | 8/2008 | Amir Husain et al. ....... | 709/203 |
| 2009/0037672 | A1 * | 2/2009 | Colbert et al. ................ | 711/154 |
| 2009/0249330 | A1 * | 10/2009 | Abercrombie et al. .......... | 718/1 |
| 2009/0259737 | A1 * | 10/2009 | Aikoh et al. .................. | 709/221 |
| 2009/0328050 | A1 * | 12/2009 | Liu et al. ...................... | 718/104 |

(Continued)

OTHER PUBLICATIONS

Clark, C., et al., "Live Migration of Virtual Machines", In Proceedings of the 2nd Symposium on Networked Systems Design and Implementation (NSDI '05), Boston, Massachusetts, May 2-4, 2005, 14 pages.
"VMware VMotion Product Datasheet", 2009, 2 pages.
The International Search Report and the Written Opinion of the International Searching Authority for International Application No. PCT/US2010/028525, mailed Nov. 27, 2014, 9 pages.

(Continued)

*Primary Examiner* — Aftab Nasir Khan
(74) *Attorney, Agent, or Firm* — Blakely, Sokoloff, Taylor & Zafman LLP

(57) ABSTRACT

A method and apparatus is disclosed herein for live replication. In one embodiment, the method comprises replicating a source server to create a replica server, assigning a routable Internet Protocol (IP) address to the replica server; and migrating one or more, but not all, on-going connections from the source server to the replica server.

19 Claims, 5 Drawing Sheets

(56) References Cited

U.S. PATENT DOCUMENTS

2010/0153338 A1* 6/2010 Ngo et al. .................... 707/610
2010/0217840 A1* 8/2010 Dehaan et al. ............... 709/220

OTHER PUBLICATIONS

International Preliminary Report on Patentability for International Application No. PCT/US2010/028525, mailed Dec. 11, 2014, 7 pages.

* cited by examiner

METHOD AND APPARATUS FOR LIVE REPLICATION

PRIORITY

The present patent application claims priority to and incorporates by reference the corresponding provisional patent application Ser. No. 61/163,372, titled, "A Method and Apparatus for Live Replication," filed on Mar. 25, 2009.

FIELD OF THE INVENTION

The present invention relates to the field of load balancing mechanism that consist of load balance (LB), resource manager (RM) and real server (RS) with virtualization; more particularly, the present invention relates to a server replication and traffic distribution based on loads of a hardware and a network.

BACKGROUND OF THE INVENTION

Load balancing is important to use hardware and network resources efficiently. There are some load balancing technologies (e.g., DNS Round Robin, LVS (Linux Virtual Server), Apache) that can distribute clients' traffic between several real servers (RSs). The problem with these specific techniques is that once a connection is distributed to one server, the connection cannot be transferred to other RS(s). If hardware and network load are stabile, one can set an appropriate threshold for the purpose of load balancing and redistributing the existing load is not so difficult. However, in general, because both hardware and network resources are shared among many applications and services, the load of which can change quite dynamically over time. The load balancing (or equivalently resource allocation) decisions done at an earlier point in time might be wrong for the current load. If load redistribution to achieve better resource management is delayed, users may not receive their expected quality of service. To set a threshold with a large margin of error is the easiest way of sustaining service quality, but it will decrease resource utilization.

Virtualization gives flexibility for resource management. VMotion and Xen's Live Migration enable moving guest OS states from one physical location to another. Since all guest OS related states are transferred, all connection can be preserved after the migration. These technologies alleviate quality degradation and resource under utilization problems because all connections can be moved to a better place near real-time after the need of load redistribution arises (e.g., load on a guest OS exceeds a specified or dynamically computed threshold).

There are still several limitations for these virtualization technologies. First, these migrations can only be done inside the same LAN, because if an IP address is changed during the migration, ongoing connections are terminated and cannot be transferred to new location. Moreover, the entire traffic is transferred to new location, which will cause a resource shortage problem at the new location too.

SUMMARY OF THE INVENTION

A method and apparatus is disclosed herein for live replication. In one embodiment, the method comprises replicating a source server to create a replica server, assigning a routable Internet Protocol (IP) address to the replica server; and migrating one or more, but not all, on-going connections from the source server to the replica server.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

DETAILED DESCRIPTION OF THE PRESENT INVENTION

Figure 1:
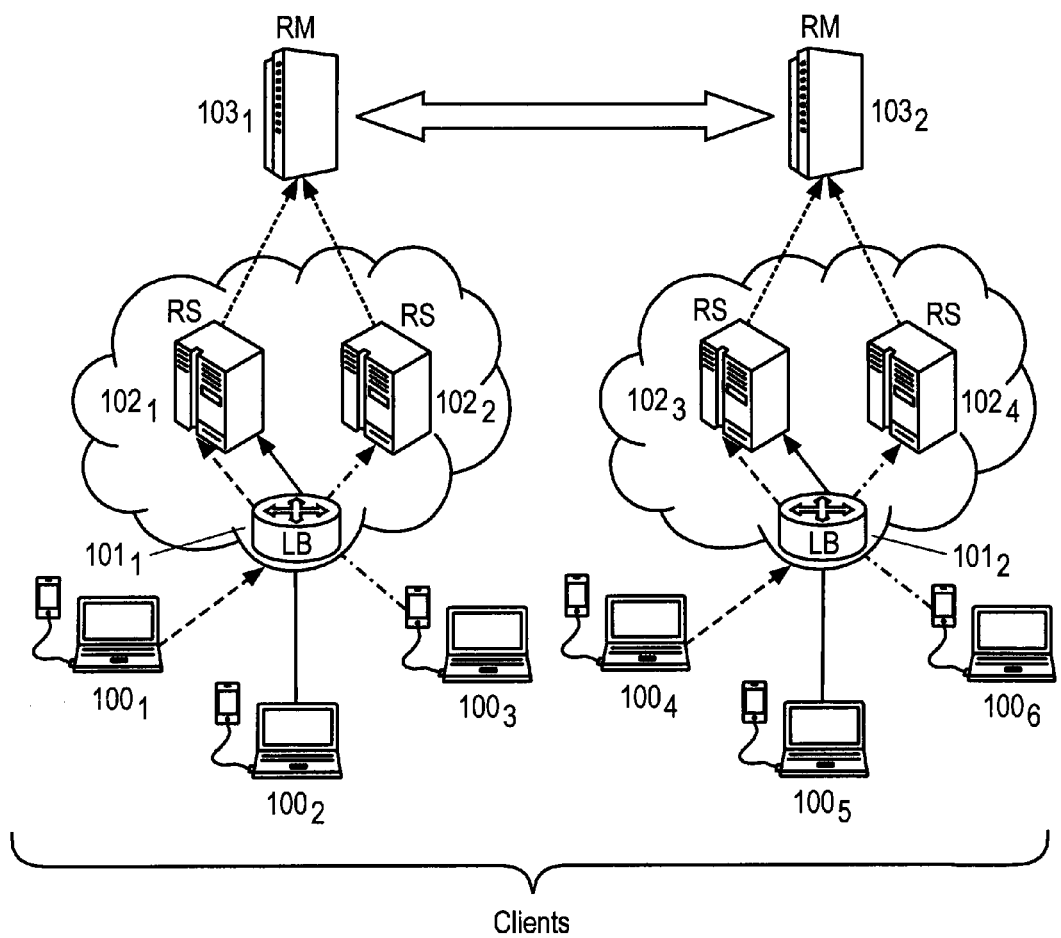
FIG. 1 illustrates one embodiment of a configuration that supports replication.

Methods and apparatus for load balancing of ongoing connections are described. In one embodiment, the method provides for migration of one or more, but generally not all, ongoing connections from one real server (RS) to another. For purposes herein, this is referred to as replication. The timing for the replication is triggered by a resource manager (RM) that retrieves resource usage information continuously from the RS. Once one of the resources (e.g., storage, memory, CPU, throughput and RTT between the RS and the client) exceeds a predefined threshold, the RM instructs the RS to copy all states to another RS. That is, the RM specifies to the source RS where to send the information and what information to send.

Apparatuses for migration enable the preservation of live connections even though an IP address is changed during the migration. The RM defines the place for the replication, and the replicated RS changes its information (e.g., MAC Address, host name, IP address) to adopt itself to the new location, and the load balancer starts transferring indicated connections to the replicated RS.

An embodiment of the invention can move a portion of the ongoing connections over different networks, in contrast to legacy technologies that can only move an entire connection in the same network. This increases the flexibility of resource management greatly.

In the following description, numerous details are set forth to provide a more thorough explanation of the present invention. It will be apparent, however, to one skilled in the art, that the present invention may be practiced without these specific details. In other instances, well-known structures and devices are shown in block diagram form, rather than in detail, in order to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

A machine-readable medium includes any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; etc.

Overview

FIG. 1 shows one embodiment of a system configuration that supports replication described herein. The traffic of clients (e.g., $100_1$-$100_6$) is captured at a load balancer (e.g., $101_1$-$101_2$), and the load balancer forwards it to a real server (e.g., $102_1$-$102_4$) using IP in IP tunneling, which is well-known in the art. Each RS and LB is managed by a resource manager (RM) (e.g., $103_1$-$103_2$), and the RM can manage the arbitrary number of RSs and LBs. In one embodiment, there are no limitation to the location of RSs and LBs, if nodes have a capability to support their function. Only a certain number of RMs, RSs, LBs, and clients are shown in FIG. 1 for illustration. The actual number of RMs, RSs, LBs, and clients that are included in the configuration may be more or less than the number shown in FIG. 1.

Replication between RSs that are managed by different RMs can be supported by interaction between the RMs. An RM monitors resources of each of its RSs with which it is communicably coupled and decides whether to perform replication based on the information. In one embodiment, this information is managed at the RM. In one embodiment, these resources include hardware resources and/or network resources. In one embodiment, the hardware resources comprise one or more of CPU usage, HDD usage, and memory usage. In one embodiment, the network resources comprise one or more of throughput between the RS and the client and RTT between the RS and the client.

Threshold Calculation $$\frac{CPU_{lim} \times (1 - \text{threshold})}{\alpha \times CPU} \leq T \quad \text{Equation 1}$$

$$\text{threshold} \leq 1 - \frac{T \times \alpha \times CPU}{CPU_{lim}}$$

$CPU_{lim}$: CPU Resource Limitation [%]
$CPU$: CPU Resource Consumed per connection [%]
$\alpha$: Incoming Traffic Rate [connection/s]
$T$: Time Required for Preparation[s]

Equation 1 above shows one embodiment of a threshold calculation for determining CPU usage. If the CPU load exceeds the result of $CPU_{lim} \times$threshold, then the replication process is started. Here, if $\alpha$ and CPU are constant, a new RS can be proposed before the threshold is exceeded and the quality of each connection can be maintained. However, $\alpha$ changes dynamically and it is difficult to predict precisely. It is almost impossible to measure the network performance before receiving connections. The CPU and a variables are monitored by the RS, but others can be defined based on hardware specifications or user input (e.g., a threshold). VMotion and Xen's Live Migration can move one RS to another, but the migration is limited by the same LAN and all connections are moved to the new RS.

In one embodiment, a different threshold is used for each different resource being monitored and each is dependent on the communication system requirements and goals to be achieved.

The techniques described herein enable movement of a part of the connections to a new RS that can be located in a different LAN. As described herein, if the RM detects one of the resources exceeds their specified threshold, then the RM finds a location that can meet these requirements. In one embodiment, if the quality is highly affected by the network resources, network resources must be considered first in determining the physical location for the new RS. If the quality is highly affected by hardware resources, hardware resources are considered first. Once the RM finds the place that can accommodate at least connections that exceed the threshold, the RM signals to the RS to make a replica of it to the new location.

Figure 2:
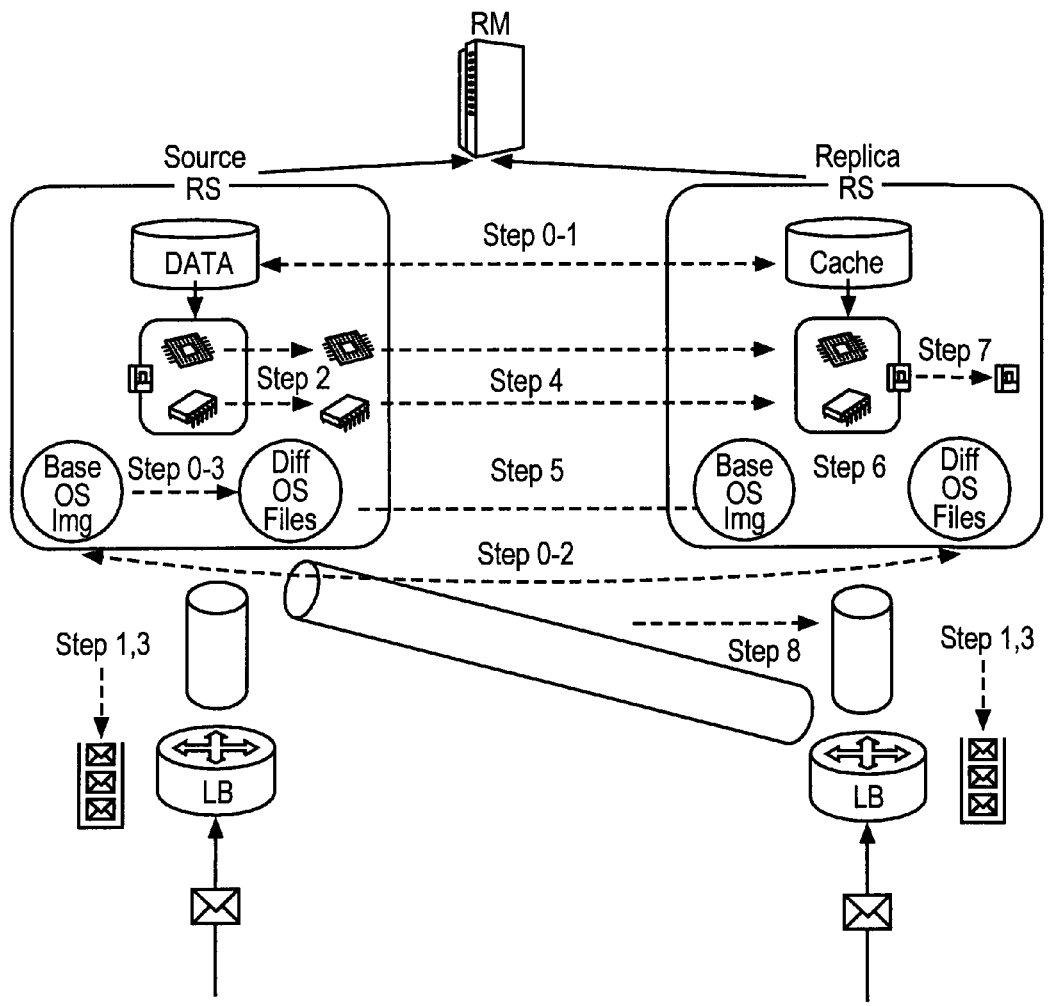
FIG. 2 illustrates one embodiment of a process of replication.

FIG. 2 shows one embodiment of a process of replication. The process is performed by processing logic that may comprise hardware (circuitry, dedicated logic, etc.), software (such as is run on a general purpose computer system or a dedicated machine), or a combination of both.

The initial steps are synchronizing the source RS and the replica RS. In one embodiment, the CPU and memory states, as well as the OS and hard disk image, are synchronized between the source RS and the replica RS, with the result of the replication process is to migrate a copy of the virtual machine running on the source RS to the replica RS.

Referring to FIG. 2, in Step 0-1, the data is transferred before the replication. If the user data portion is large, the data can be managed separately from the operating system portion. The data portion can be distributed to the network before the replication or a cache which stores data requested by replica RS is used in replica RS or network storage. In Step 0-2, the basic operating system (OS) portion (base OS Img) can also be distributed before the replication. In Step 0-3, if some files are changed from the base OS Img, these are stored apart from the base OS Img and managed as Diff OS files with hash value of these files. That is, the entire OS need not be copied with both the source and replica RSs have the same OS; only the difference needs to be copied and sent from the source RS to the replica RS.

After the initial steps have been completed, the replication can occur. At Step 1, the RM instructs LB(s) to start buffering for all traffic destined to a source RS.

At Step 2, the source RS is suspended and a snapshot of OS states (e.g., CPU, memory, and network interface controller (NIC) states) are created. Obtaining such a snapshot is known in the art. For example, this snapshot is originally used for VMotion or Live Migration and is extended for the replication described herein. Before creating the snapshot, it is possible to reduce the actual memory size to shorten the snapshot creation time. This may be accomplished using XEN, which supports the reduction of physical memory assignments while the VM is running.

At Step 3, the RM instructs the LB(s) to resume packet sending to a source RS. In one embodiment, a replica is created while CPU, memory, NIC and HDD are synchronizing. Therefore, there is no need to buffer packets at steps 1 and 3. In such a case, packets transferred to the replica RS just before step 6 are buffered. That is, steps 1 and 3 can be omitted and this step can occur before step 6.

Packets transferred to the replica RS are still kept at LB. In one embodiment, the location of the replica RM is determined according to the flow diagram depicted in FIG. 3.

Figure 3:
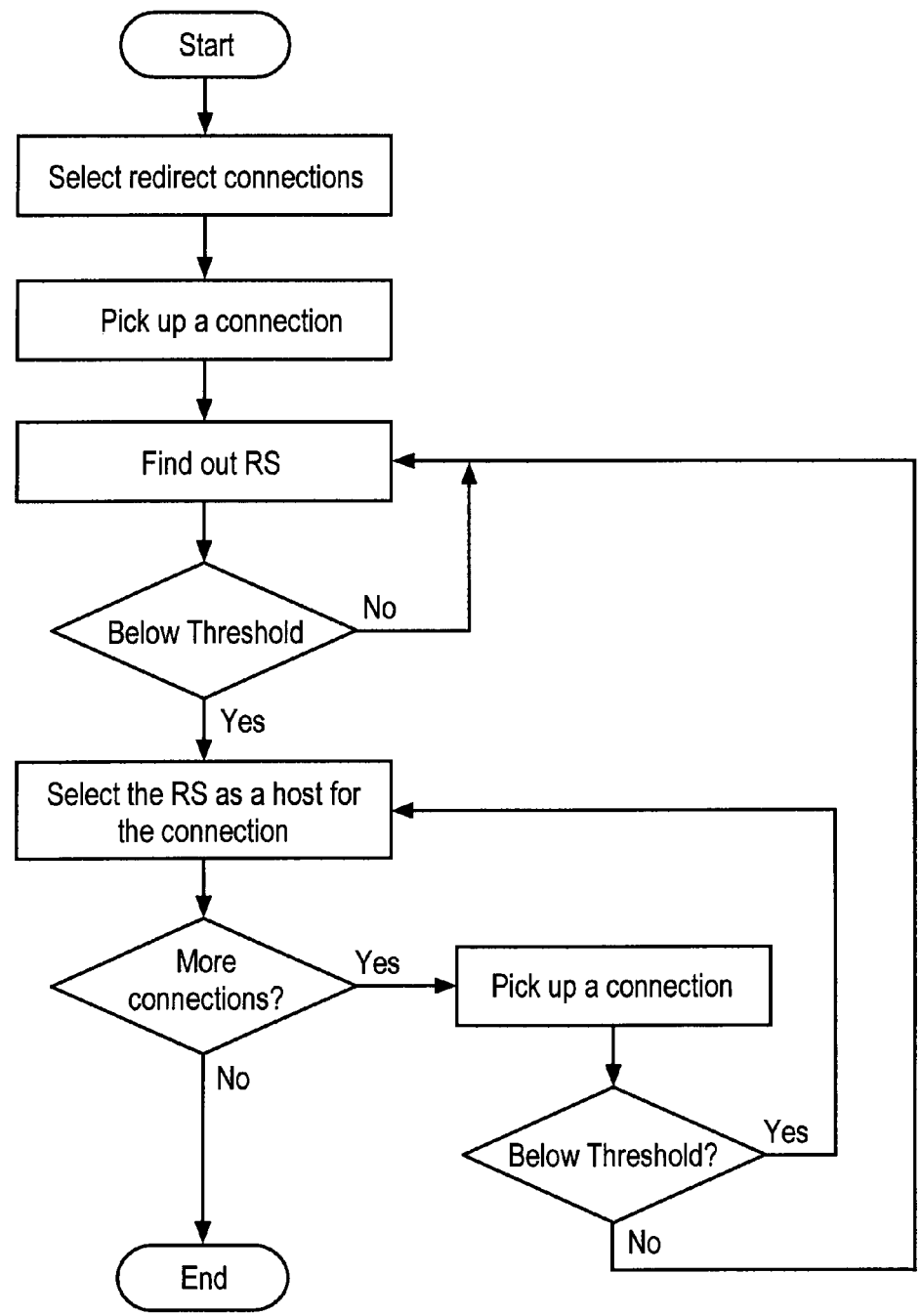
FIG. 3 is a flow diagram of one embodiment of a process for finding a replication place.

Referring to FIG. 3, the process begins by processing logic selecting a subset of connections to the source RS for redirection to the replica RS (processing block 301). Removal of these connections from the source RS renders the resource usage of remaining connections at the source RS to be below the previously specified resource usage threshold. Processing logic handles each connection in this subset in arbitrary order (processing block 304) and for each connection in this subset, processing logic in the RM determines the nearest RS of the connection with sufficient hardware resources to accommodate these connections (processing block 303). Processing logic determines whether the resource used at the RS to which the connection may be transferred is below the thresholds with the addition of the connection (i.e., no violation of thresholds) (processing block 304). If not, then the process returns to processing block 303. That is, if some resource usages exceed their respective thresholds, the RM checks if the next closest RS for this connection can accommodate the connation without any threshold violation itself. This search process continues until an appropriate RS is found. If the nearest RS can accommodate the connection (i.e., with the addition of this connection, no resource usage thresholds are violated.), then the process continues at processing block 304 where the RS is selected as the replica RS for this connection.

For the next connection in the subset of connections to be redirected, the process is repeated except the process first considers if the RS(s) considered for the previous connection can accept new connections (processing block 306). If there are more connections, processing logic selects a connection (processing block 307) and checks whether resource usage is below a threshold. If it is below the threshold, then the process returns to processing block 305 and the RS is selected as a host for the connection. If not, the process returns to processing block 303 to find another RS.

This process is continued until a replica RS is found for every connection. If no RS is found to accommodate the connection, the RS which minimally exceeds the threshold is assigned.

Referring to Step 4, the snapshot created at Step 2 is transferred to the replica RS.

Then, at Step 5, the Diff OS files are sent to the Replica RS. If there have already been some of these files used by other RS(s), the hash value is sent first and files which already existed are not transferred from the source RS.

Is it possible to say Step 4 and Step 5 are done simultaneously and continued while the CPU, memory, NIC and HDD are updated before Step 6 if there are any updates for these states.

At Step 6, the replica RS is activated using the previously transferred snapshot, Base OS img and Diff OS files.

At Step 7, before receiving packets, some information for the replica RS is changed. If the replica RS resides in a different LAN from the source RS, at least the IP address is changed and the MAC address and the FQDN (Fully Qualified Domain Name) should be changed. Thus, a new routable IP address is assigned to the replica RS. In one embodiment, the new routable IP address is assigned by the RM. The new IP address received from the RM is set forth through a hypervisor running under the replica RS, and the replica RS changes its IP address to the new one during the activation. Software installed on the replica RS receives the indication from hypervisor and changes its IP address. In the case of a Xen Para-Virtualization (OSS based hypervisor), a front end driver is installed in the RS. In one embodiment, the front-end driver operates as described in FIG. 4.

Note that the new IP addresses for the connections that are moved would be sent to the access points and/or base stations so that the access points and base stations are able to route packets for the connections to the replica RS, instead of the original RS. To perform the notification, the RM indicates the new location to the LB at access points and base stations), and the LB sends the packets to the replica RS using IP in IP. In another embodiment, if access points and base stations are not present, other nodes such as a gateway are notified.

Figure 4:
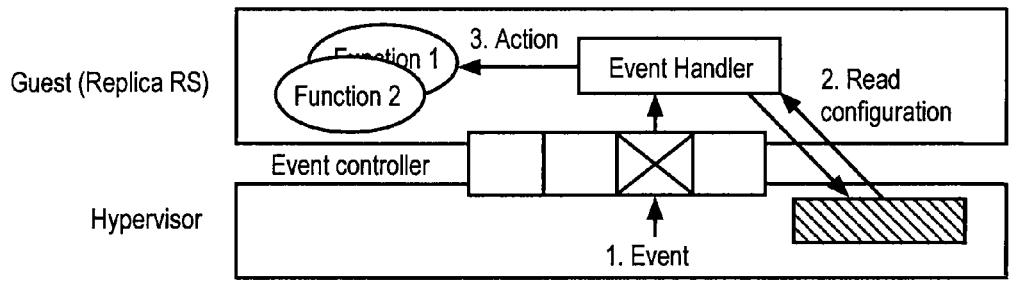
FIG. 4 illustrates one embodiment of a host information update mechanism.

FIG. 4 shows host information update mechanism used a replication process described herein. Referring to FIG. 4, a new event and its event handler are added to an event controller. Since some virtual drivers (e.g., video, network interface) are installed to the guest running on top of the hypervisor, if the event hander is added for one of these drivers, there is no need to install new software to the guest. When the event handler receives the event from the hypervisor, then it reads some memory space that is used to communicate with the hypervisor from the guest, and calls functions to reflect the information written at the space.

At Step 8, some of the connections indicated by the RM are changed so that its destination is changed from the source RS to the replica RS, and the LB starts forwarding these packets using IP in IP tunneling to the replica RS. Since these packets are de-capsulated at the replica RS before sending to the application, all connections including TCP connections running at the replica RS do not recognize these changes and these connections can be maintained.

Figure 5:
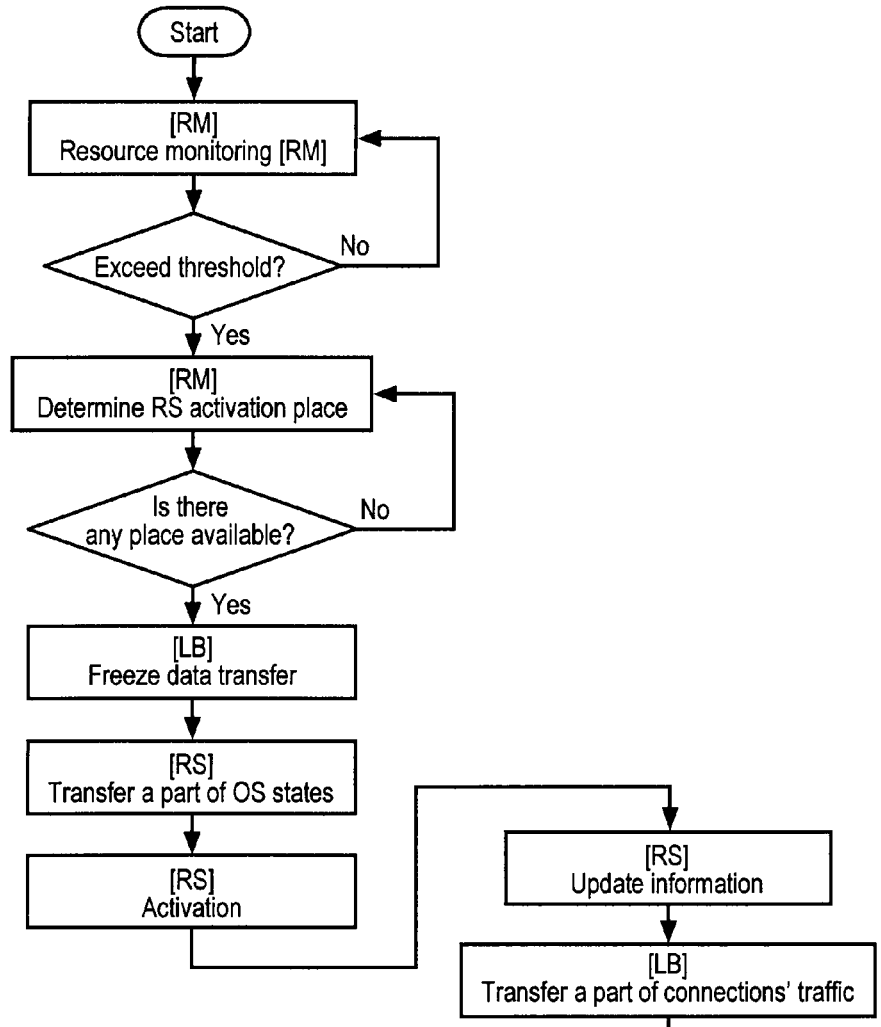
FIG. 5 is a flow diagram illustrating one embodiment of the replication process.

FIG. 5 is a flow diagram of one embodiment of a replication process. The process is performed by processing logic that may comprise hardware (circuitry, dedicated logic, etc.), software (such as is run on a general purpose computer system or a dedicated machine), or a combination of both.

Referring to FIG. 5, the process begins by processing logic performing resource monitoring (processing block 501). In one embodiment, the processing logic performing the resource monitoring is in the resource manager.

While performing resource monitoring, processing logic determines whether a threshold has been exceeded (processing block 502). If not, the process transitions to processing block 501 and the process repeats. If a threshold has been exceeded, processing logic identifies a real server activation location (processing block 503). In one embodiment, the processing logic identifying the real server activation location is in the resource manager. Processing logic tests whether any place is available (processing block 504). If not, the process transitions to processing block 503 and the process continues. If a location is available, processing logic freezes the data transfer (processing block 505), processing logic transfers a portion of the OS states (processing block 506), and processing logic performs the activation (processing block 507). In one embodiment, the processing logic freezing the data transfer is in the load balancer. In one embodiment, the processing logic transferring a portion of the OS states and performing the activation is in the real server.

Thereafter, processing logic updates the information at the new location (processing block 508) and processing logic transfers a portion of the traffic of the connection to the real server (processing block 509). In one embodiment, the processing logic updating the information is in the real server. In one embodiment, the processing logic transferring a portion of the connections' traffic is in the load balancer.

Thereafter, the process ends.

There is a possibility that clients receive the same packets from both the source RS and the replica RS. Duplicate packets may affect TCP throughput. Therefore, the LB can prevent packets being sent from the source RS to clients whose connections are transferred to the replica RS, and only passes packets from the replica RS to clients. This prevention can be done at the source RS or the hypervisor of the source RS as well.

An Example of a Computer System

Figure 6:
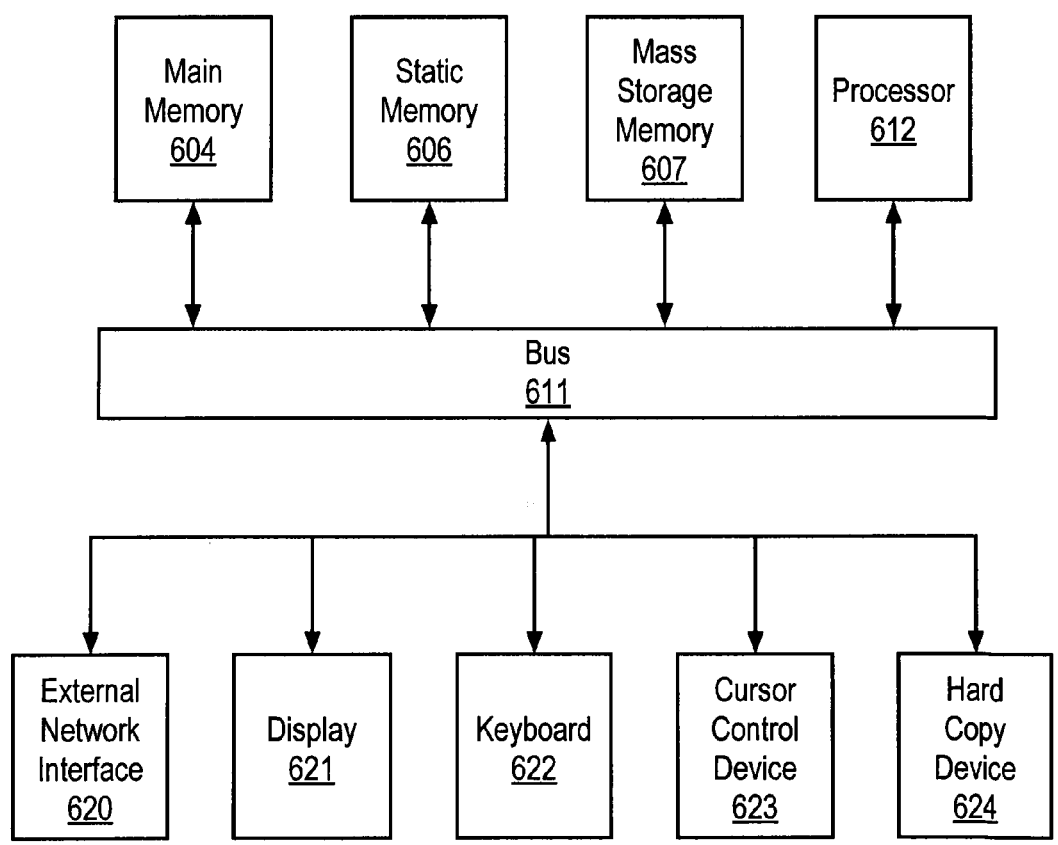
FIG. 6 is a block diagram of one embodiment of a computer system.

FIG. 6 is a block diagram of an exemplary computer system that may perform one or more of the operations described herein. Referring to FIG. 6, computer system 600 may comprise an exemplary client or server computer system. Computer system 600 comprises a communication mechanism or bus 611 for communicating information, and a processor 612 coupled with bus 611 for processing information. Processor 612 includes a microprocessor, but is not limited to a microprocessor, such as, for example, Pentium™, PowerPC™, Alpha™, etc.

System 600 further comprises a random access memory (RAM), or other dynamic storage device 604 (referred to as main memory) coupled to bus 611 for storing information and instructions to be executed by processor 612. The instructions may cause the system to perform one or more of the functions described herein. Main memory 604 also may be used for storing temporary variables or other intermediate information during execution of instructions by processor 612.

Computer system 600 also comprises a read only memory (ROM) and/or other static storage device 606 coupled to bus 611 for storing static information and instructions for processor 612, and a data storage device 607, such as a magnetic disk or optical disk and its corresponding disk drive. Data storage device 607 is coupled to bus 611 for storing information and instructions.

Computer system 600 may further be coupled to a display device 621, such as a cathode ray tube (CRT) or liquid crystal display (LCD), coupled to bus 611 for displaying information to a computer user. An alphanumeric input device 622, including alphanumeric and other keys, may also be coupled to bus 611 for communicating information and command selections to processor 612. An additional user input device is cursor control 623, such as a mouse, trackball, trackpad, stylus, or cursor direction keys, coupled to bus 611 for communicating direction information and command selections to processor 612, and for controlling cursor movement on display 621.

Another device that may be coupled to bus 611 is hard copy device 624, which may be used for marking information on a medium such as paper, film, or similar types of media. Another device that may be coupled to bus 611 is a wired/wireless communication capability 625 to communication to a phone or handheld palm device.

Note that any or all of the components of system 600 and associated hardware may be used in the present invention. However, it can be appreciated that other configurations of the computer system may include some or all of the devices.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims which in themselves recite only those features regarded as essential to the invention.

We claim:

1. A method comprising:
monitoring resource usage information for a source server;
replicating, with a processor, a live running state of the source server that is running a virtual machine serving a plurality of clients to create a replica server with the live running state in a replicated virtual machine, wherein replicating the source server to create the replica server is performed based on a relationship between the resource usage of a resource and a threshold according to $$\text{threshold} \leq 1 - \frac{T \times \alpha \times CPU}{CPU_{lim}}$$

where $CPU_{lim}$ is a central processing unit (CPU) resource limitation, CPU is a CPU resource consumed per connection, $\alpha$ is an incoming traffic rate, and T is a time required for preparation;
assigning a routable Internet Protocol (IP) address to the replica server;
dividing a plurality of on-going connections between the plurality of clients and the virtual machine run at the source server into one or more connections that are to be maintained between one or more clients and the virtual machine and one or more connections that are to be transferred to the replicated virtual machine; and
migrating the one or more connections that are to be transferred to the replicated virtual machine from the virtual machine run at the source server to the replicated virtual machine run at the replica server.

2. The method defined in claim 1 wherein replicating the source server to create the replica server is performed in response to determining that the resource usage of the resource is above the threshold.

3. The method defined in claim 1 wherein the resource comprises one or more selected from a group consisting of: storage, memory, CPU usage, throughput between the source server and a client, and round-trip time (RTT) between the source server and the client.

4. The method defined in claim 1 further comprising:
selecting one of the one or more connections to be redirected;
finding an available server location, the available server location being the replica server;
checking whether resource usage at the replica server is below a threshold; and
migrating the one connection to the replica server if resource usage at the replica server is below the threshold.

5. The method defined in claim 1 wherein replicating a source server to create a replica server comprises synchronizing the CPU and memory states of the source and replica servers.

6. The method defined in claim 1 wherein creating replicating a source server to create a replica server comprises synchronizing operating systems of the source and replica servers.

7. The method defined in claim 1 further comprising causing packets destined for the source server to be stopped and forwarded to the replica server.

8. The method defined in claim 1 wherein assigning a routable Internet Protocol (IP) address to the replica server is performed using a hypervisor.

9. The method defined in claim 1 further comprising changing a MAC address and the FQDN of the replica server.

10. The method defined in claim 1 wherein the source server and replica server are parts of different networks.

11. The method defined in claim 1 wherein the routable IP address is assigned to the replicated virtual machine.

12. The method of claim 1, wherein dividing the plurality of on-going connections further comprises:
while the virtual machine is being replicated, a load balancer
buffering a first data transmitted to the virtual machine from the clients to be transferred to the replicated virtual machine, and
forwarding a second data to the virtual machine from clients that are to maintain an existing connection with the virtual machine run; and
in response to the migrating, transmitting the buffered first data from the load balancer to the replicated virtual machine run at the replica server.

13. A communication system comprising:
a first server comprising at least one processor and at least one memory;
a second server; and
a resource manager operable to cause a live running state of a virtual machine executing on the first server that is serving a plurality of clients to be replicated on a replicated virtual machine executing on the second server, to cause a routable Internet Protocol (IP) address to be assigned to the virtual machine executing on the second server, to cause a plurality of on-going connections between the plurality of clients and the virtual machine executed at the first server to be divided into one or more connections that are to be maintained between one or more clients and the virtual machine and one or more connections that are to be transferred to the replicated virtual machine, and to cause the one or more connections that are to be transferred to the replicated virtual machine to be migrated to the second server,
wherein the resource manager is operable to monitor resource usage information for the first server and replicates the first server based on the relationship between the resource usage of a resource and a threshold according to $$\text{threshold} \leq 1 - \frac{T \times \alpha \times CPU}{CPU_{lim}}$$

where $CPU_{lim}$ is a central processing unit (CPU) resource limitation, CPU is a CPU resource consumed per connection, $\alpha$ is an incoming traffic rate, and T is a time required for preparation.

14. The system defined in claim 13 wherein the resource manager causes the virtual machine executed on the first server to be replicated on the second server in response to determining that the resource usage of the resource is above the threshold.

15. The system defined in claim 13 wherein the resource comprises one or more selected from a group consisting of: storage, memory, CPU usage, throughput between the source server and a client, and round-trip time (RTT) between the source server and a client.

16. The system defined in claim 13 wherein the virtual machine executing on the first server is replicated on the second server by synchronizing the CPU and memory states of the source and replica servers and synchronizing operating systems of the first and second servers.

17. The system defined in claim 13 further comprising a load balancer communicably coupled to the resource manager, the resource manager instructing the load balancer to stop transferring packets destined for the first server and forwarding the packets to the second server if they are part of a connection that is migrated from the first server to the second server.

18. The system defined in claim 13 further comprising a hypervisor to assign the routable Internet Protocol (IP) address to the virtual machine executing on the second server.

19. An article of manufacture having one or more non-transitory computer readable storage media storing instructions which, when executed by a processor, cause the processor to perform a method comprising:
monitoring resource usage information for a source server;
replicating a live running state of the source server that is running a virtual machine serving a plurality of clients to create a replica server with the live running state in a replicated virtual machine, wherein replicating the source server to create the replica server is performed based on a relationship between the resource usage of a resource and a threshold according to $$\text{threshold} \leq 1 - \frac{T \times \alpha \times CPU}{CPU_{lim}}$$

where $CPU_{lim}$ is a central processing unit (CPU) resource limitation, CPU is a CPU resource consumed per connection, $\alpha$ is an incoming traffic rate, and T is a time required for preparation;

assigning a routable Internet Protocol (IP) address to the replica server;

dividing a plurality of on-going connections between the plurality of clients and the virtual machine run at the source server into one or more connections that are to be maintained between one or more clients and the virtual machine and one or more connections that are to be transferred to the replicated virtual machine; and migrating the one or more connections that are to be transferred to the replicated virtual machine from the virtual machine run at the source server to the replicated virtual machine run at the replica server.

\* \* \* \* \*